(12) United States Patent
Pledger

(10) Patent No.: US 7,439,852 B1
(45) Date of Patent: Oct. 21, 2008

(54) FLAT TIRE ALERT SYSTEM

(76) Inventor: Willis L. Pledger, 747 E. K Ave., Visalia, CA (US) 93292

( * ) Notice: Subject to any disclaimer, the term of this patent is extended or adjusted under 35 U.S.C. 154(b) by 265 days.

(21) Appl. No.: 11/470,805

(22) Filed: Sep. 7, 2006

(51) Int. Cl.
B60C 23/00 (2006.01)
(52) U.S. Cl. .......................... 340/443; 340/442; 73/146
(58) Field of Classification Search .............. 340/442, 340/443; 73/146; 701/29
See application file for complete search history.

(56) References Cited

U.S. PATENT DOCUMENTS

| | | | |
|---|---|---|---|
| 3,659,264 | A | 4/1972 | Barabino |
| 3,950,726 | A | 4/1976 | Fujikawa et al. |
| 4,037,192 | A | 7/1977 | Cowit |
| 4,173,011 | A * | 10/1979 | Gibson ........................ 340/443 |
| 5,207,173 | A | 5/1993 | Sadri |
| D366,846 | S | 2/1996 | Handfield et al. |
| 6,466,127 | B1 * | 10/2002 | Martin ........................ 340/443 |
| 6,696,935 | B2 | 2/2004 | Bonardi et al. |
| 2003/0201880 | A1 | 10/2003 | Lu |
| 2008/0042818 | A1 * | 2/2008 | Kuentz et al. ............... 340/443 |

* cited by examiner

Primary Examiner—Jeff Hofsass
Assistant Examiner—Ojiako Nwugo
(74) Attorney, Agent, or Firm—Advantia Law Group; Michael W. Starkweather; Jason P. Webb

(57) ABSTRACT

A flat tire alert system for detecting flat tires on trailers. The system includes: a plurality of sensor modules coupleable to an axle, and configured to sense deflation of a tire. Each sensor includes: a coupling mechanism, a retention spring, a first arm, a joint mechanism, a second arm, and a roller. The system also includes: an indicator module, in communication with the sensor modules, and configured to indicate a response when the sensor module senses a deflation of a tire; and an alert module in the form of a horn, in communication with the indicator module, and configured to provide an alert when the indicator module indicates a deflation of a tire. Further, there is a control module having an On/Off switch, in communication with the indicator module, and configured to control the indicator module.

7 Claims, 3 Drawing Sheets

FLAT TIRE ALERT SYSTEM

BACKGROUND OF THE INVENTION

1. Field of the Invention

The present invention relates to tire alert systems, specifically a flat tire alert system for detecting flat tires on trailers.

2. Description of the Related Art

In the related art, it has been known to use flat tire alerting or indicating devices for indicating when an automobile tire has lost a predetermined amount of air pressure therein. If an automobile tire goes flat due to insufficient tire pressure or blows out due to the penetration of sharp objects during driving, it is very likely that the tire will suffer from a "slow leak" versus becoming flat immediately. Therefore, the puncture in the tire would be difficult to detect if it is not serious. This could take some time before the driver is aware of the punctured tire. In this situation, there is an increased risk for an accident if the driver makes a sudden brake during driving. Some improvements have been made in the field to resolve this problem. Examples include but are not limited to the references described below, which references are incorporated by reference herein:

U.S. Pat. No. 6,696,935, issued to Bonardi et al., discloses a tire monitoring (TM) system includes a peak detector signal filter that is configured to substantially prevent impulse noise from increasing a data slicer threshold, while simultaneously allowing the data slicer threshold to follow the variations in a received message attributable to signal fading. The TM system also automatically determines the location of a plurality of vehicle tires relative to the vehicle; utilizes a single receiver to receive messages of multiple lengths and masks an alarm when a missing ID code corresponds to a stored ID code associated with a flat tire.

U.S. Pat. No. 4,037,192, issued to Cowit, discloses an air-operated switch device is provided in a housing having an internally threaded part threadedly coupled to the valve stem of a tire. The switch device is in operative proximity with the valve stem and has an open condition when the tire pressure is above a predetermined air pressure and a closed condition when the tire pressure is reduced to one below a predetermined air pressure. The switch device has a movable electrical contact device controlled in position by the pressure of air in the tire. A circuit electrically connects a battery, an audible alarm device and a radio transmitter in the housing with the switch device in circuit whereby when the switch device is moved to its closed condition the battery actuates the alarm device and the transmitter. A radio receiver receives a signal transmitted by the transmitter thereby indicating that the tire is flat.

U.S. Patent Application Publication No.: 2003/0201880, by Lu, discloses an automobile flat tires/tire blowout alert system—a detecting system combining a micro-processor and several pairs of alert indicators with an ultrasonic sensor. With the ultrasonic sensor to detect the height variation between each tire and the ground, the system monitors the variation of the each tire's tire pressure. Then, after the microprocessor calculates and contrasts the detected status, the buzzer sends out alert signals and commands the alert indicators to signalize for identification, which in turn to maintain the security of the automobile's tires and prevent them from being damaged.

U.S. Pat. No. 5,207,173, issued to Sadri, discloses a low pressure tire indicator is a mechanical device for producing an audible warning to the driver of low or inadequate tire pressure. The low pressure tire indicator includes a strap for mounting the low pressure tire indicator to a wheel hub. A spring housing is mounted on the strap, rocker arm is mounted on an anchor pin positioned within the spring housing, and extends away from the wheel hub towards the inside tread wall of a pneumatic tire mounted on the wheel hub. The rocker arm includes a roller on a free end for engaging the inside tread wall of the tire during a low pressure condition. A hammer is mounted on the anchor pin and moves in unison with the rocker arm. A spring is mounted on the anchor pin, and, during proper tire inflation, normally urges the hammer into contact with the wheel hub, and normally positions the roller on the free end of the rocker arm between the wheel hub and the inside tread wall of the tire.

U.S. Pat. No. 3,659,264, issued to Barabino, discloses a system is provided for signaling an operator that a vehicle's tire pressure is over or under a preset range. A pressure responsive diaphragm within the tire causes a reed to vibrate when the tire pressure goes over or under a predetermined range and vibration of the reed is sensed by a slave reed in the vehicle which, in turn, generates a signal to the operator.

U.S. Pat. No. 3,950,726, issued to Fujikawa et al., discloses a low tire pressure alarm system for pneumatic tires, wherein a radio transmitter which is adapted to produce an alarm signal of a predetermined frequency upon detection of an abnormal pressure drop is accommodated in a hollow casing for mounting on a wheel cap casing of a vehicle wheel. The alarm signal is transmitted through the hollow casing per se or through a metal coating on the hollow casing where the latter is formed from a non-conductive material. The transmitted signal is received by a receiving set which includes a receiving antenna located on the underside of the vehicle body for shielding the same from spurious or extraneous signals and a radio receiving unit mounted within a luggage compartment of signals. Upon reception of the alarm signal, the radio receiver actuates an alarming device which produces a flashing light or sounds to indicate the pressure drop to an operator of the vehicle.

U.S. Design Pat. No.: D366,846, issued to Handfield et al., discloses ornamental design for a tire pressure monitor.

The inventions heretofore known suffer from a number of disadvantages which include being unsuitable for trailers, expensive, inconvenient, and/or difficult to install.

What is needed is a flat tire alert system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available tire alert systems. Accordingly, the present invention has been developed to provide a flat tire alert system for detecting flat tires on trailers.

In one embodiment of the present invention, there is a flat tire alert system for detecting flat tires on trailers. The system may include a plurality of sensor modules that may be removably coupleable to an axle, and/or may be configured to sense a deflation of a tire. Each sensor may include: a coupling mechanism that may be configured to removably couple to an end of an axle; a retention spring that may be coupled to the coupling mechanism and/or may extend outwardly therefrom; a first arm that may be pivotally coupled to the retention spring and/or may extend outwardly therefrom; and/or a joint mechanism that may be coupled to an end of the first arm at an end opposite the coupling mechanism; and/or a second arm that may be pivotally coupled to the joint mechanism at an end opposite the first arm and/or may extend outwardly therefrom; and a roller that may be rotatably coupled to an end of the second arm opposite the joint mechanism.

In addition, an embodiment of the present invention may also include: an indicator module that may be in communication with the sensor modules, and/or may be configured to indicate a response when the sensor module senses a deflation of a tire; and/or an alert module that may be in communication with the indicator module, and/or may be configured to provide an alert when the indicator module indicates a deflation of a tire; and/or a control module that may be in communication with the indicator module, and/or may be configured to control the indicator module.

Moreover, the system may include a control module having an On/Off switch, and/or an alert system that may be in the form of a horn.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
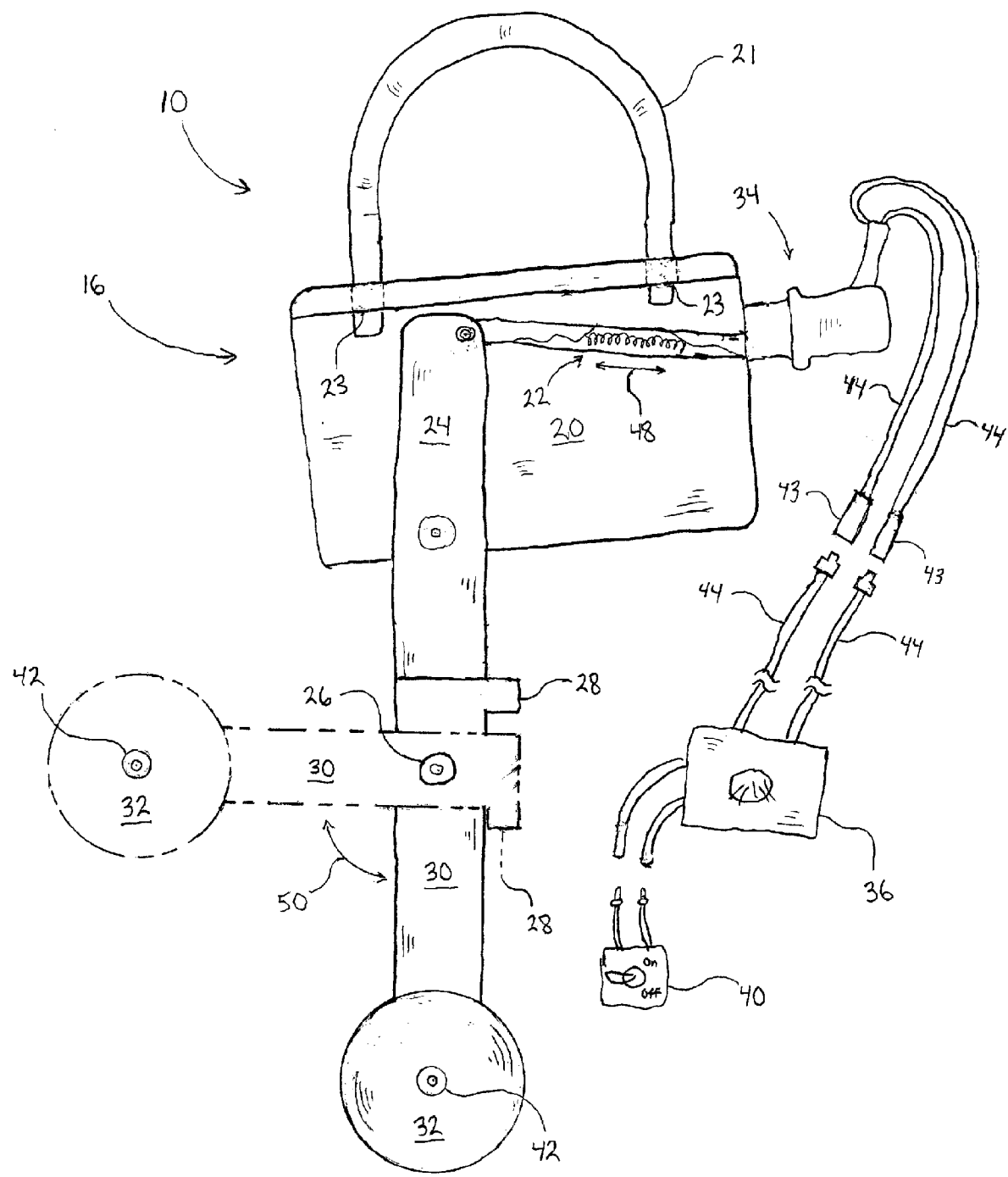
FIG. 1 is a rear perspective view of a flat tire alert system, according to one embodiment.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Looking to the figures, there is a flat tire alert system 10 for detecting flat tires 12 on trailers 14. The system may include a plurality of sensor or sensor modules 16 removably coupleable to an axle 18 and configured to sense a deflation of a tire 12. Each sensor may include: a coupling mechanism 20 removably coupleable to an end of an axle; a retention spring 22 coupled to the coupling mechanism (also referred to as bracket), and extends outwardly therefrom.

The illustrated embodiment of the flat tire alert system also includes: a first arm 24 pivotally coupled to the retention spring, and extends outwardly therefrom; a joint mechanism 26 coupled to an end 28 of the first arm at an end opposite the coupling mechanism; and a second arm 30 pivotally coupled to the joint mechanism at an end opposite the first arm and extends outwardly therefrom; and a roller 32 rotatably coupled to an end of the second arm opposite the joint mechanism. A non-limiting example of the joint mechanism may include a nut, screw, etc. The sensor module includes: the hook 21: bracket 20; spring 22, arms 24, 30; and rollers 32 cooperating with each other to mechanically communicate with the indicator module 34, thereby triggering the indicator module to transmit an electrical signal to the indicator alert module or horn 36 whenever a flat tire occurs.

In addition, an embodiment of the present invention may also include: an indicator module 34 in communication with the sensor modules 16, and is configured to indicate a response when the sensor module senses a deflation of a tire 12. A non-limiting example of an indicator module 34 may include the retention spring 22 being mechanically connected to a moisture-resistant sending unit having wires 44 with plugs 43 attached thereon, according to one embodiment. Another non-limiting example of a sensor 16 may include a Doran Pressure Pro Horse Trailer Tire Pressure Monitoring System, Doran Manufacturing, LLC, 2851 Massachusetts Ave, Cincinnati, Ohio 45225.

Moreover, the illustrated system further includes an alert module 36 in electrical communication with the indicator module, and is configured to provide an alert when the indicator module indicates a deflation of a tire. A non-limiting example of an alert module may include a horn.

Further, the illustrated embodiment of the flat tire alert system further includes a control module 38 having an On/Off switch 40 that is in electrical communication with the indicator module, and is configured to control the indicator module. A non-limiting example of a control module is described in U.S. Pat. No. 3,950,726 issued to Fujikawa et al., which is incorporated by reference herein.

Figure 2:
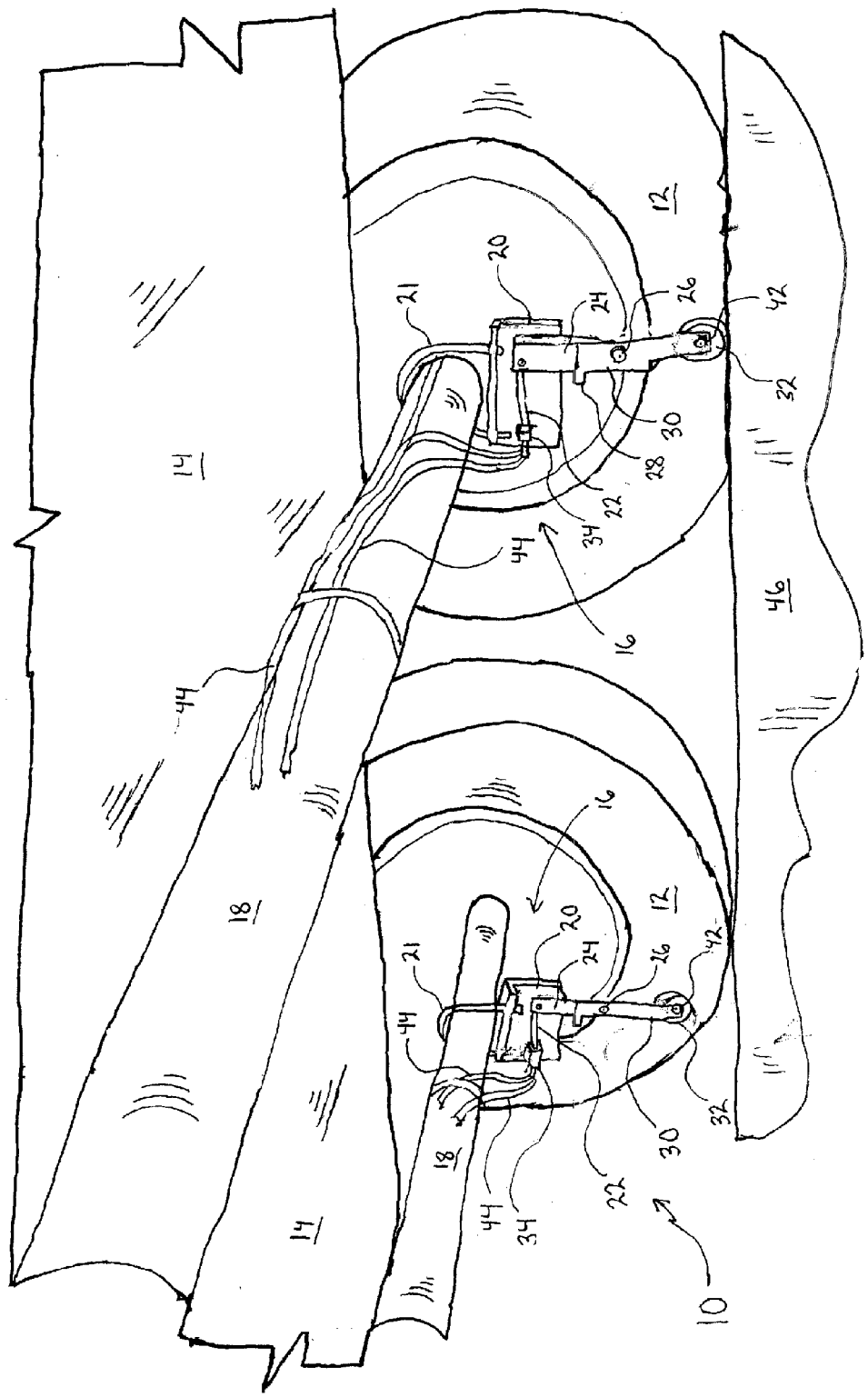
FIG. 2 is a front view of a flat tire alert system, according to one embodiment.
Figure 3:
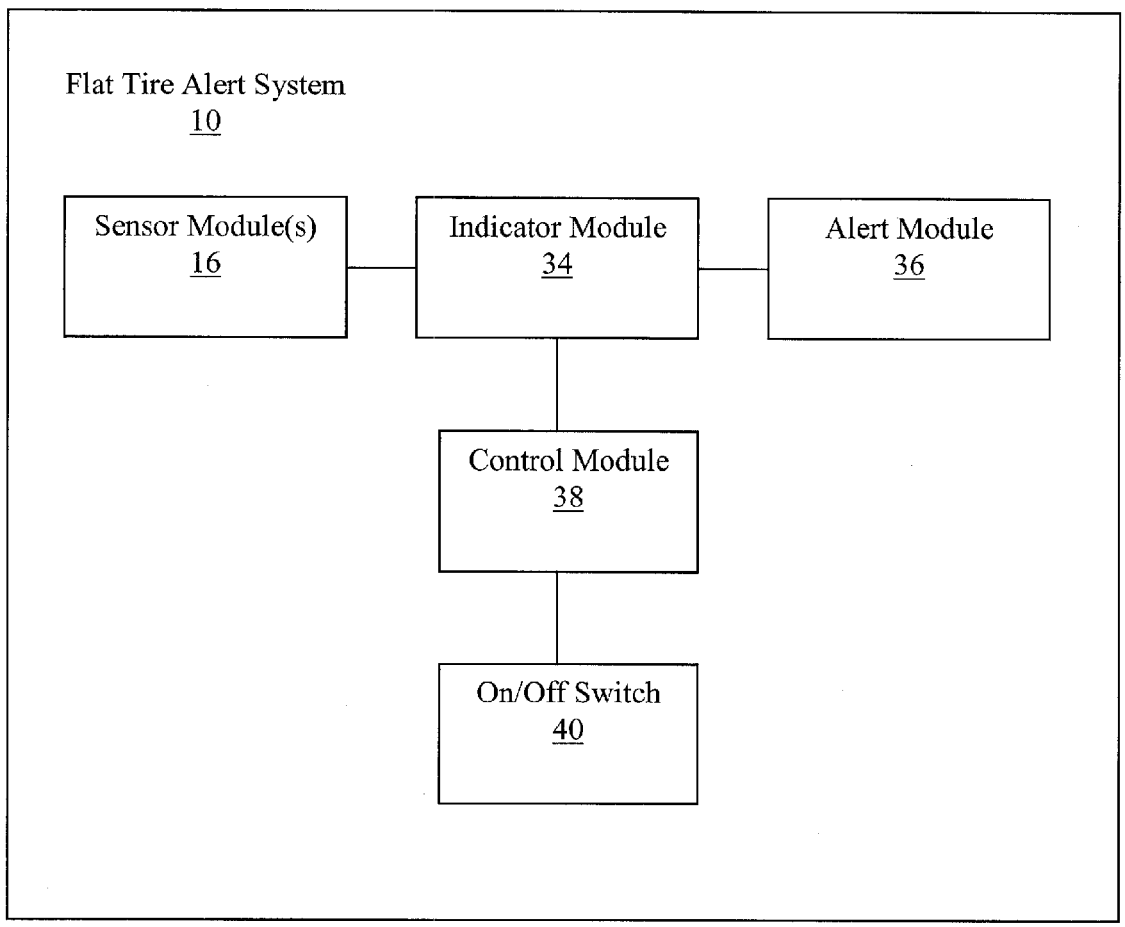
FIG. 3 is a block diagram of a flat tire alert system, according to one embodiment.

In operation, the present invention may be applied to different types of trailers 14. During normal travel while towing a trailer 14, a user can removably couple the sensor(s) 16 to the trailer axle(s) 18 by inserting the hook 21 through the bracket holes 23 in order lock hook to the bracket via bolts, nuts, etc. The user may position the sensor(s) such that the sensor arms 24, 30 and roller(s) 32 are directed downward in a position perpendicular to the road 46, but not touching the road. The user would then connect the sensor(s) 16 to the horn 36 by coupling the wire(s) 44 to the plugs 43, thereby completing installation of the system 10. At this point, the user may activate the sensor control module 38 by turning the switch 40 to the "On" mode. If a predetermined amount of air pressure is lost in tire(s) 12, the roller coupled to the sensor arm 30 would contact the paved road as shown in FIG. 2, thereby applying a force to the sensor arms 24, 30 and roller(s) 32 causing the retention spring 22 to be compressed, as indicated by arrow 48. The compressed spring enables the sensor(s) 16 to electrically communicate with the horn 36, located in or around the dashboard of the trailer, thereby causing an audible sound to alert the user of flat tire(s). This alert signal from the horn enables the user to pull the trailer to the roadside and investigate the problem. After the trailer is on the roadside, the user may turn the audible sound off by turning the switch to the "Off" mode, thereby deactivating the control module.

Once the flat tire 12 is repaired or replaced, the affected axle 18 would be elevated again so the roller(s) 32 will no longer touch the road 46, thereby turning off the horn until the next tire 12 goes flat.

Additionally, the system 10 includes a feature where the user can pivotally rotate arm 30 ninety degrees about the bolt or screw 26, as indicated by arrow 50, such that the arm and roller are parallel to the road 46, thereby preventing any potential damage to the sensor(s) 16 when driving the trailer in reverse.

The embodiment of the flat tire alert system 10 provides safety, convenience, and protection for users operating trailers on the road. Instead of being surprised by a shredded tire, deformed wheel rim, and other serious damage caused by an undetected flat tire, the system would automatically alert the driver to a problem. This enables the motorist to investigate the situation in a timely manner before cost damage to tire rims occurred. The system also helps prevent a trailer-related accident from occurring that could potentially result in serious vehicular damage, higher insurance costs, injuries, and fatalities. Further, the system provides a peace of mind for safety conscious trailer owners by providing them with a clear, concise indication of a potential hazard.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Although the figures illustrate only two sensors 16 being removably coupled to the trailer axle 18, any number of sensors may be coupled to trailer axles, depending on the number of trailer tires 12 and/or needs of the user. For example, three sensors, four sensors, etc.

It is also envisioned that the flat tire system 10 may vary in size to removably coupleable to various sizes of trailers axles 18.

It is expected that there could be numerous variations of the design of this invention. An example is that the sensors 16; coupling mechanism 20; retention spring 22; arms 24, 30; joint mechanism 26; roller 32; indicator module 34; horn 36; and/or control module 38 may vary in length, width, size, etc.

Finally, it is envisioned that the components of the device may be constructed of a variety of materials, such as metal, metal alloys, steel, etc.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A flat tire alert system for detecting flat tires on trailers, comprising:
   a) a plurality of sensor modules, removably coupleable to an axle, and configured to sense a deflation of a tire, wherein each sensor module includes:
      a1) a coupling mechanism, configured to removably couple to an end of an axle;
      a2) a retention spring, coupled to the coupling mechanism and extending outwardly therefrom;
      a3) a first arm, pivotally coupled to the retention spring and extending outwardly therefrom;
      a4) a joint mechanism, coupled to an end of the first arm at an end opposite the coupling mechanism;
      a5) a second arm, pivotally coupled to the joint mechanism at an end opposite the first arm and extending outwardly therefrom; and
      a6) a roller, rotatably coupled to an end of the second arm opposite the joint mechanism;
   b) an indicator module, in communication with the sensor modules, and configured to indicate a response when the sensor module senses a deflation of a tire; and
   c) an alert module, in communication with the indicator module, and configured to provide an alert when the indicator module indicates a deflation of a tire.

2. The flat tire alert system of claim 1, further comprising a control module, in communication with the indicator module, and configured to control the indicator module.

3. The flat tire alert system of claim 2, wherein the control module includes an On/Off switch.

4. The flat tire alert system of claim 3, wherein the alert module is a horn.

5. A flat tire alert system for detecting flat tires on trailers, consisting essentially of:
   a) a plurality of sensor modules, removably coupleable to an axle, and configured to sense a deflation of a tire, wherein each sensor module includes:
      a1) a coupling mechanism, configured to removably couple to an end of an axle;
      a2) a retention spring, coupled to the coupling mechanism and extending outwardly therefrom;
      a3) a first arm, pivotally coupled to the retention spring and extending outwardly therefrom;
      a4) a joint mechanism, coupled to an end of the first arm at an end opposite the coupling mechanism;
      a5) a second arm, pivotally coupled to the joint mechanism at an end opposite the first arm and extending outwardly therefrom; and
      a6) a roller, rotatably coupled to an end of the second arm opposite the joint mechanism;
   b) an indicator module, in communication with the sensor modules, and configured to indicate a response when the sensor module senses a deflation of a tire;
   c) an alert module, in communication with the indicator module, and configured to provide an alert when the indicator module indicates a deflation of a tire; and
   d) a control module, in communication with the indicator module, and configured to control the indicator module.

6. The flat tire alert system of claim 5, wherein the control module includes an On/Off switch.

7. The flat tire alert system of claim 6, wherein the alert module is a horn.

* * * * *